United States Patent [19]

Malueg

[11] 4,033,541
[45] July 5, 1977

[54] TORQUE REJECTION SOFT MOUNTED PLATFORM

[75] Inventor: Richard M. Malueg, Glendora, Calif.
[73] Assignee: McDonnell Douglas Corporation, Long Beach, Calif.
[22] Filed: May 30, 1975
[21] Appl. No.: 582,096
[52] U.S. Cl. .......................... 248/358 R; 188/1 B; 248/20; 354/74
[51] Int. Cl.² ..................... F16F 15/08; F16F 11/00
[58] Field of Search ............... 248/20, 358 R, 22; 354/74; 188/1 B; 248/15, 18

[56] References Cited
UNITED STATES PATENTS

| | | | |
|---|---|---|---|
| 3,060,824 | 10/1962 | Brenner et al. | 354/74 |
| 3,094,054 | 6/1963 | Moors et al. | 318/638 X |
| 3,477,665 | 11/1969 | Legrand | 248/358 R |
| 3,514,054 | 5/1970 | Mard et al. | 248/358 X |
| 3,606,233 | 9/1971 | Scharton | 248/358 R |
| 3,635,427 | 1/1972 | Balke | 248/358 R X |
| 3,703,999 | 11/1972 | Forys | 248/20 |

Primary Examiner—J. Franklin Foss
Attorney, Agent, or Firm—Kleinberg, Morganstern, Scholnick & Mann

[57] ABSTRACT

A system for stabilizing sensitive apparatus from translational and rotational vibrations of the structure on which the apparatus is mounted uses a conventional bearing or a flexure pivot to achieve angular isolation in series with a compliant isolator for attenuating translational vibrations. Wideband corrective torques are applied to the apparatus by linear actuators connected between the vibrating structure and the sensitive apparatus, in parallel with the isolator and bearing combination. Motion of the apparatus is sensed by rate gyros and angular accelerometers mounted on the sensitive apparatus. These instruments through servomechanism loops, drive the linear actuators to oppose the motions.

16 Claims, 6 Drawing Figures

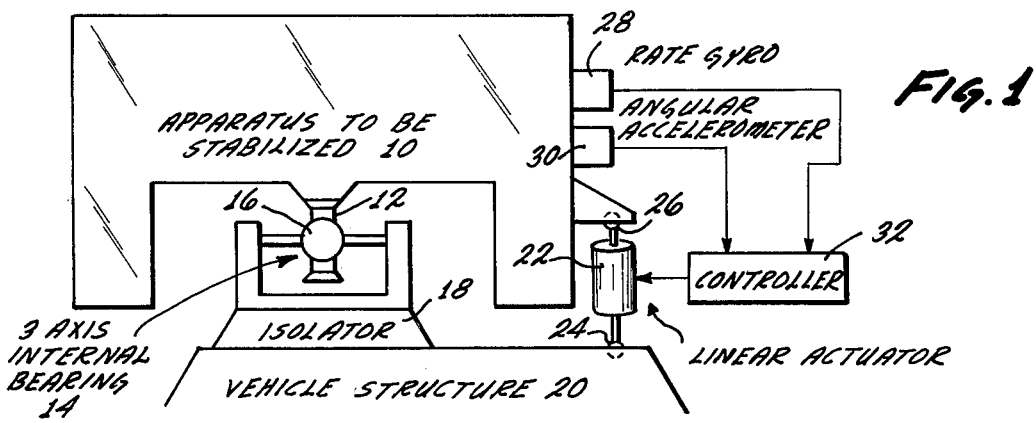
FIG. 1
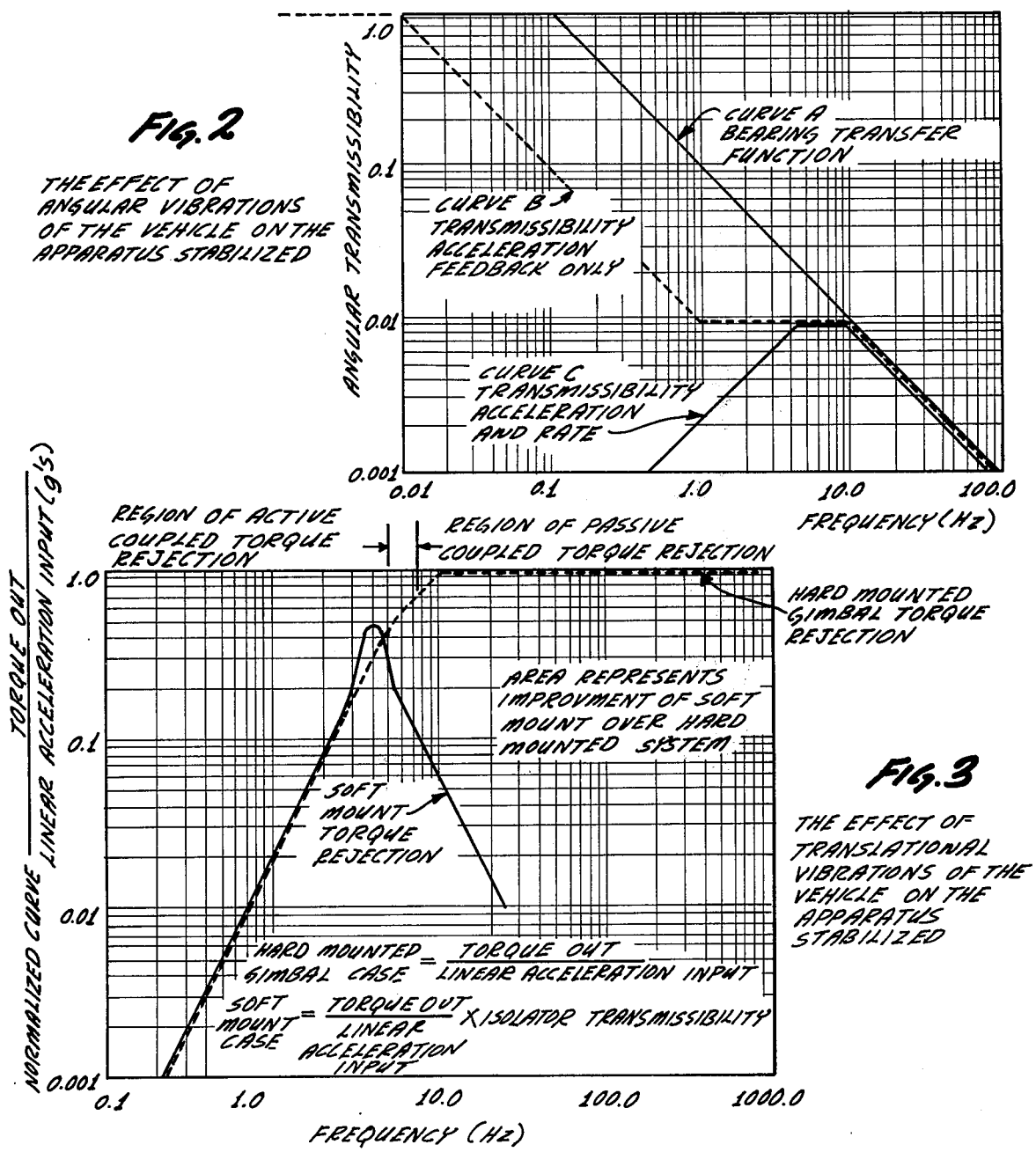
FIG. 2
THE EFFECT OF ANGULAR VIBRATIONS OF THE VEHICLE ON THE APPARATUS STABILIZED
FIG. 3
THE EFFECT OF TRANSLATIONAL VIBRATIONS OF THE VEHICLE ON THE APPARATUS STABILIZED THE EFFECT OF ANGULAR VIBRATIONS OF THE VEHICLE ON THE APPARATUS STABILIZED FOR AN EMBODIMENT USING FLEXURE PIVOTS

TORQUE REJECTION SOFT MOUNTED PLATFORM

BACKGROUND OF THE INVENTION

The present invention relates to stabilization systems and in particular to systems for stabilizing sensitive, vehicle-borne apparatus from uncontrolled and unwanted motions of the vehicle, such as vibrations and shocks in both translational and rotational types of motion.

The problem of stabilizing apparatus mounted on a moving vehicle is one to which considerable effort has been applied. Most prior art systems have been designed for use with inertial platforms and as a result they stabilize against relatively low frequency or relatively high frequency movements, but not both.

Prior art stabilized camera mounts such as described in the patent to D. E. Moors, et al., U.S. Pat. No. 3,094,054, issued to the assignee of the present invention of June 18, 1963, tend to isolate the camera from a fairly complete spectrum of frequencies, but at the expense of substantial complexity. A three-axis, flexure gimbal system upon which the camera was mounted stabilized the camera against angular motion. The camera was movable about any of the three axis by appropriate torquer solenoids.

It is desirable that a stabilization system intended to isolate sensitive equipment such as a camera should operate over a wide frequency range, including frequencies as low as 0.01Hz. The stabilization system should not have any resonating members, since these will tend to amplify vibrational inputs. It is further desirable that a stabilization system be of resonable size, light in weight, reliable, and efficient in the use event electrical power. The system should be fail-safe in the even of power failures to avoid damage to the sensitive apparatus.

Very low frequencies, below 1Hz can generally be attenuated by gyro-controlled gimbal platforms that reject angular motion. Most inertial platforms are very effective in this spectral region. Higher frequencies, greater than 100Hz are usually attenuated by conventional vibration mounts whose resonance frequencies are generally in the range of 5 to 50 Hz.

Thus, it is the middle range of frequencies, from 1 to 100 Hz that the major isolation problem exists. The prior art approach to that problem, represented by the above-mentioned patent to Moors, et al., makes use of a system in gimbal rings, vibration mounts, and rate gyros.

A more recent approach is described in the patent to E. L. Forys, et al, entitled "Wide Band Stabilizer," U.S. Pat. No. 3,703,999, issued to the assignee of the present invention on Nov. 28, 1972. The apparatus to be stabilized was mounted on soft spring isolators. Torque-cancelling signals were applied to linear actuators in parallel with the soft spring isolators. Servo circuitry derived appropriate torque-cancelling signals from rate gyros and angular accelerometers.

This system operates well over a very broad frequency spectrum. Low frequencies are attenuated by an active servo loop utilizing a rate gyro. Intermediate frequencies are attenuated by the angular accelerometer servo loop. The higher frequencies are attenuated by the compliance of the soft spring isolators. Because the angular motion capability of the system is limited, some applications might require that the sensitive apparatus or a part of it be gimbal mounted in the stabilized package.

The present invention is distinguishable from the above mentioned Wide Band Stabilizer described in U.S. Pat. No. 3,703,999, Where Forys, et al. stabilized and supported the sensitive apparatus from the vehicle structure by a parallel combination of a soft spring isolator and a linear actuator, the present invention isolates the apparatus to be stabilized from the vehicle structure by use of a linear actuator in parallel with the series combination of a bearing and a complaint isolator. In different embodiments the bearing may be either a conventional rolling or sliding frictional bearing or it may be a torsional pivot, the later having no friction but having a restoring torque proportional to angular displacement.

According to the preferred embodiment of the present invention, the apparatus is supported at its center of gravity in three degrees of rotational freedom. Linear actuators are connected directly to the sensitive apparatus, and are capable of applying wideband counter-rotational forces directly to the sensitive apparatus in response to rotational inputs. This permits the actuator to be effective against the coupled torques which result from unavoidable residual displacement of the center of gravity of the sensitive apparatus from the kinematic center of the bearing.

SUMMARY OF THE INVENTION

According to a preferred embodiment of the present invention, the apparatus to be stabilized is supported at its center of gravity on a bearing which permits three degrees of freedom in rotation. This provides the angular rejection advantage of a bearing mounting while avoiding the size, weight, and complexity of a gimbal system. The bearing is isolated from the structure of the vehicle by a complaint isolator, which attenuates the higher frequency translational vibrations transmitted to the bearing from the vehicle structure.

Linear actuators produce stabilizing torques which stabilize the sensitive apparatus about each of the three axes of rotation. One end of each actuator is connected to the apparatus to be stabilized through a spherical bearing or U-joint, and the other end of inertial actuator is attached to the vehicle structure through another spherical bearing or a second U-joint.

Angular accelerometers and rate gyros are mounted to the apparatus to be stabilized. From their output signals, an electronic controller derives appropriate driving signals to be applied to the linear actuators for use in opposing the unwanted motions of the apparatus, relative to intertial space. Generally, purely translational motions of the vehicle do not adversely affect the rotational apparatus.

As the Forys et al system, the combination of linear actuators in parallel with complaint isolators permits the use of a relatively soft isolator which is most effective for medium to high frequency vibration and which supports the apparatus to be stabilized. The linear actuators therefore are not required to support the weight of the apparatus to be stabilized, and instead are required only to apply stabilization and control torques to the apparatus.

In a conventional gimbal system wherein torques are applied to the apparatus to be stabilized by a torquer isolated from the vibrating vehicle structure by a passive vibration isolator, resonance of the passive isolator in series with the torquer causes an instability in the system which manifests itself at the resonant frequency of the loaded isolator. In such a system, where the passive isolator is required to support the total system, the resonant frequency typically is as high as 20 Hz. This resonance presents a fundamental limitation since the active loop gain must be less than unity when the added isolator phase shift causes over 180° of loop phase shift The end result is that loop gain must be reduced to keep the system stable and hence performance sacrificed when a gimbal is used with a passive isolator. This factor explains why gimbals are generally hard mounted. One unfortunate consequence of hard mounting gimbals is that in the presence of linear inputs, any center of gravity offsets cause coupling from linear inputs to rotational outputs. In addition, any non-rigid body responses of the payload, such as lenses, or shutters, or electronics, are now unprotected from medium and high frequency linear vibrational inputs. The present invention circumvents these coupling problems.

The system of the present invention provides active response unlimited by the resonance of the soft mount by connecting the actuator directly between the vehicle and the apparatus to be stabilized, in parallel with the passive vibration isolator and bearing. At the same time, the present system retains the vibration attenuation ability of the passive soft mount isolator and the excellent torque rejection ability of the bearing.

In alternate embodiments a flexure pivot may be substituted for the conventional spherical bearing. The flexure may provide a passive natural frequency of 0.1Hz and can be designed to support a wide range of loads. Throughout this application the terms "bearing" and "bearing means" unless expressly limited are here defined to comprehend without limitation conventional bearings, hinges, pivots, and the like, as well as flexure bearings or pivots.

In other embodiments where the apparatus to be stabilized is an optical sensor capable of providing signals defining the direction to an external object or target which is moving relative to the sensor, the rate of angular motion of such moving object may be utilized. Through the addition of an image velocity loop, the stabilization system then becomes a tracker having passive isolation.

Relatively little movement of the linear actuators is required generally to stabilize against the vibrations and shocks normally encountered. However, the amount of movement of the linear actuators required to point the stabilized apparatus to the desired direction may be somewhat greater, depending on the angular limits required and the geometry of the structure chosen to implement the system. Thus, in some applications, the use of fairly long-stroke actuators may be a desirable embodiment. Linear actuators are attractive for short or limited stroke applications since they can be fabricated simply with two solenoids in series, one for pushing up and one for pulling down on a given attachment point.

For those embodiments requiring large angular stroke, wide gap torquers are feasible, where the housing is attached to the vehicle and the armature is attached to the load similar to the linear actuator case. The gap would be large enough to handle the linear vibration displacements and the armature could be wound for two axis torquing. Such a torquing motor would be mounted at the payload center of gravity. Opening the gap of most torque motors reduces electrical efficiency and therefore when possible, linear actuators are used.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is expressly understood, however, that the drawings are for the purpose of illustration and description only and are not intended as a definition of the limits of the invention.

FIG. 1 is a schematic diagram of the stabilization system of the present invention installed about one rotational axis FIG. 2 is a graph illustrating the angular transmissibility of the active mount. Transmissibility is the ratio of payload motion to vehicle input motion.

FIG. 3 is a graph illustrating the effect of vehicular translational vibrations on the apparatus to be stabilized.

Figure 4:
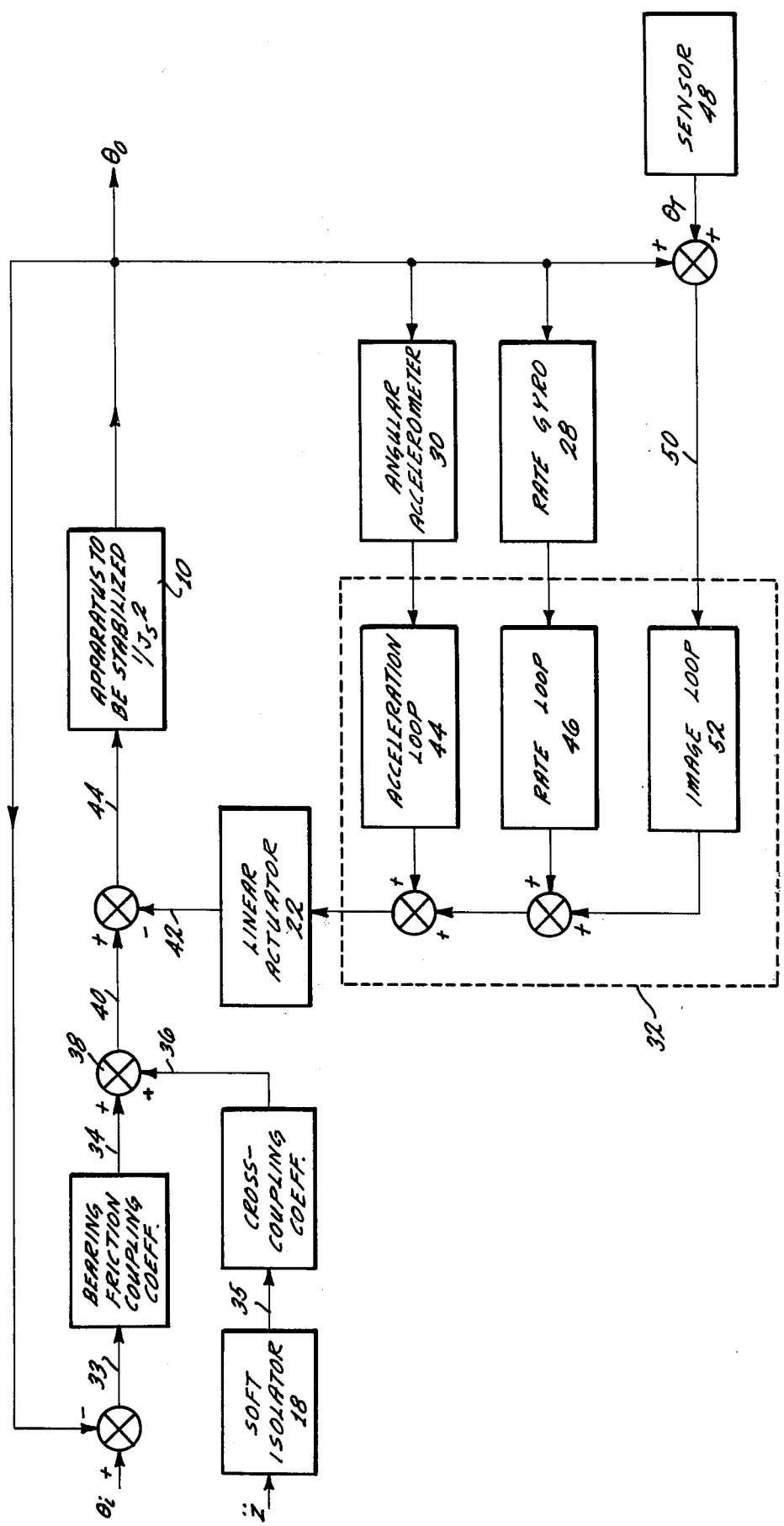
FIG. 4 is a system block diagram.

FIG. 1 is a simplified schematic view of the stabilization system of the present invention instrumented to provide stabilization about a rotational axis which is assumed to be perpendicular to the plane of the figure. The apparatus 10 to be stabilized is fixed to the rotatable plane 12 of a spherical bearing assembly 14. The rotatable part 12 of the bearing 14 slides over the surface of the fixed part 16 of the spherical bearing 14 to provide three degrees of rotational motion within rather large angular limits. The bearing may be air bearing or a conventional bearing.

The spherical bearing assembly 14 is attached to an isolator 18, which includes a soft, resilient member. The weight of the apparatus 10 is supported by the isolator 18 which in turn is fixed to the vehicle structure 20 which is subjected to motions of various sorts.

A linear actuator 22 is connected to the vehicle structure 20 by a spherical bearing 24 and is connected to the apparatus 10 by a second similar spherical bearing 26. Because the center of gravity of the apparatus 10 to be stabilized is located at the center of the support spherical bearing 16 the linear actuator 22 is not required to bear any of the weight of the apparatus 10.

A rate gyro 28 and an angular accelerometer 30 are fixed to the apparatus 10. These generate electrical signals in response to movement of the apparatus 10 relative to inertial space. Other types of motion sensors such as optical, electrostatic or electromagnetic, can also be employed to generate correcting signals to be applied to the actuator. The electrical output of rate gyro 28 and the angular accelerometer 30 are applied to a controller 32 which generates an output signal. The controller output signal is applied to the linear actuator 22 in opposing motions of the apparatus 10.

Any motion about an axis perpendicular to the plane of FIG. 1 will be sensed by both the angular accelerometer 30 and the rate gyro 28. By suitable calculation of the parameters of the stabilization system within the controller 32, the magnitude of the motion-compensating signal to be applied to the linear actuator 22 can be mathematically determined. Any sensed rotational motion can therefore be opposed substantially by simultaneously applying a torque to the apparatus 10 in a direction opposing the motion, thereby reducing to negligible levels the net torque applied to the apparatus 10.

The rate gyro 28 is adequate to detect the relatively low frequency motions about the sensitive axis such as might result from changes in vehicle 20 attitude and velocity. The gyro 28 signals these changes to the controller 32 which drives the actuator 22 to provide compensating motion to counter the rotational motion input to the apparatus 10. The angular accelerometer 30 is better able to sense and to respond to the higher frequency motions resulting from shocks and vibrations of the vehicle.

A better understanding of the operation of the stabilization system can be obtained by considering the torques that are operating on the apparatus 10 to be stabilized. The torques applied on the linear actuator 22 are not considered in this discussion since such torques are corrective, and the discussion relates only to the disturbing torques. The first external torque is the torque which would be exerted by a rotation of the vehicle structure 20 about the sensitive axis. This rotational motion is applied to the apparatus 10 through the main spherical bearing, 16.

Assuming the torque due to friction in the bearing is equal to a constant B times the relative angular velocity ($\dot{\theta}_i - \dot{\theta}_L$) where $\dot{\theta}_i$ is the angular velocity of the vehicle $\dot{\theta}_L$ is the angular velocity of the sensitive apparatus in the same rotational direction, the equation of motion can be written as $$J \ddot{\theta} = B (\dot{\theta}_i - \dot{\theta}_L)$$

where J is the moment of inertia of the apparatus being stabilized. The transfer function of the bearing or transmissibility is the amplitude of the angular vibration of the apparatus to be stabilized divided by the amplitude of the angular vibration of the vehicle. The transmissibility of the bearing can be shown to be $$\frac{\theta_L(s)}{\theta_i(s)} = \frac{1}{s \frac{J}{B} + 1} \quad \text{where } s = jw$$

From this it follows that the angular transmissibility is approximately 1.0 for frequencies of vibration up to $B/2\pi J$, while for higher frequencies the transmissibility decreases at 6db per octive. This is illustrated by Curve A in FIG. 2, where the angular transmissibility of the bearing is the ordinate and the frequency of the vehicle vibration is the absicca.

The angular accelerations of the apparatus 10 are sensed by the angular accelerometer 30 and applied through controller 32 to the linear actuator 22 which exerts forces against the apparatus 10 in a direction opposing the applied acceleration.

If the controller 32 were to apply through the actuator 22 a correcting torque proportional to the angular acceleration of the apparatus 10 to be stabilized, the equation of motion would be:

$$J \ddot{\theta}_L = B [\dot{\theta}_i - \dot{\theta}_L] - K \ddot{\theta}_L$$

where K is a constant, from which it can immediately be seen that the result of applying such a corresponding torque is, in effect, to increase the moment of inertia of the apparatus to be stabilized from J to J + K. This has the effect of lowering the corner frequency from $B/2\pi$ J to $B/2\pi$ (J + K). The overall result would be a shifting of Curve A to the left. This is beneficial in that for any frequency about $B/2\pi$ J the transmissibility will be reduced. Curve B of FIG. 2 shows the transmissibility with acceleration feedback.

The rate gyro 28 responds to angular velocity of the apparatus 10, and is capable of sensing very small angular velocities. Thus, the rate gyro feedback loop is most useful in the lower frequency range. By judicious design, the rate gyro feedback loop transfer function can be implemented as a double integrator thereby giving the transfer function of the rate gyro feedback loop a positive slope for lower frequencies, which, when combined with the downward slope of the transfer function of the acceleration feedback loop, results in a net overall transfer function as shown in curve C of FIG. 2. If a free or integrating gyro is used which gives as its output inertial position, the curve C can be generated by using the integral of position as feedback.

To this point the discussion has been concerned with torques transmitted to the apparatus to be stabilized through the spherical bearing in response to rotations of the vehicle structure. A second form of torque must also be considered. It is called the coupled torque and results as follows. If the center of gravity of the apparatus 10 to be stabilized is not located at the geometric or kinematic center of the spherical bearing 16, the center of gravity of the apparatus to be stabilized will tend to rotate about the center of the spherical bearing in response to translational vibrations of the spherical bearing. In practice, every effort is made to balance the apparatus to be stabilized so as to bring its center of gravity into coincidence with the center of rotation. Nevertheless, it is practically impossible to obtain a perfect balancing, and as a practical matter the coupled torques must always be considered.

In the low frequency ranges, torques are reduced by the system servo action. As seen in FIG. 2, this servo action diminishes with a −12db/oct. slope, the difference between Curve A and Curve C. This accounts for the +12db/oct. slope in the low frequency range of FIG. 3.

In the example shown in FIG. 3 the isolator resonant frequency occurs at approximately 4.0 Hz. Above this resonant frequency, the isolator attenuates at 12db per octive which results in the downward slope of the high frequency side of the curve of FIG. 3. In the case of the conventional gimbal stabilizer, the coupled torque rejection curve comes up to unity in the high frequencies. The vast improvement in the reduction of coupled torque to be stabilized and opposed by the stabilization system shown in FIG. 1.

A third type of torque which is imposed on the apparatus to be stabilized results from the stiffness of the wires connecting the rate gyro 28 and the angular accelerometer 30 with the controller 32. This torque is frequency insensitive and therefore is of little concern to the dynamic designs of the stabilization system.

If it is desired to point the apparatus at a moving point or target, rather than to stabilize the apparatus with respect to a fixed point in inertial space, this may be accomplished by substituting for the rate gyro loop, an image loop, which uses an input based on the target rate. This, of course, requires that a seeker or equivalent apparatus be present on the stabilized package to measure the angular rate of the moving target.

The various feedback loops and torques, discussed above in connection with the preferred embodiment using a spherical bearing, are interrelated as shown in the sytem block diagram of FIG. 4. There, the relative angular motion between the apparatus to be stabilized and the vehicle structure to be shown to be coupled through the friction of the spherical bearing, yielding a torque 34 which represents the torque imparted to the apparatus by angular motions of the vehicle structure.

A second disturbing torque results from translational vibrations of the vehicle structure coupled through the soft isolator 18 to the spherical bearing and hence to the apparatus to to stabilized, resulting in the coupled torques described above. These two sources of disturbing torques are added at point 38.

Their sum 40 represents the net disturbing torques applied to the apparatus to be stabilized. This disturbing torque is summed mechanically by the apparatus with the total correcting torque 42 supplied by the stabilization system. Ideally the total correcting torque applied by the stabilization system would exactly cancel the disturbing torque.

In general, the two torques are not exactly cancelled and as a result an error torque 44 is applied to the apparatus 10, which is assumed to respond in a purely inertial manner. This motion of the apparatus 10 is sensed by the angular accelerometer 30 and a signal is derived through an acceleration loop for application to linear actuator 22. Likewise, the angular rate is sensed by the rate gyro 28 and, in an appropriate circuit, a control signal based on the angular rate is generated.

In the event it is desired to stabilize the apparatus to a direction given by a moving target $\theta_T$ it is necessary to obtain the angular position of the moving target relative to the apparatus by use of a sensor 48 which is part of the apparatus to be stabilized 10. The direction to the target in inertial space coordinates is found by adding the angle of the target relative to the apparatus to the angle that the apparatus makes with the inertial coordinate system.

The direction to the target in inertial coordinates is represented by the signal at point 50. This signal may be utilized in yet another loop called the image loop 52, which supplies an input to the linear actuator 22. In the diagram of FIG. 4, the controller, 32 of FIG. 1, is shown by the dashed lines enclosing the acceleration loop 44, the rate loop 46, and the image loop 46, and the image loop 52.

The desired transfer functions for the acceleration loop, the rate loop, and the image loop can be determined from the desired overall performance characteristics such as those shown in FIG. 2 and from the characteristics of the various components of the system, such as the inertia of the apparatus to be stabilized, the dynamic response of the linear actuator, and the range of response of the rate gyro and angular accelerometer.

Conventional Laplace transform analysis is used, similar to that analysis shown in Forys et al., Wide Band Stabilizer patent, U.S. Pat. Office No. 3,703,999 supra, referred to above. The novelty of the present invention does not reside in the design details of the various loops, which must be shaped to fit the specific instrumentation used.

Figure 5:
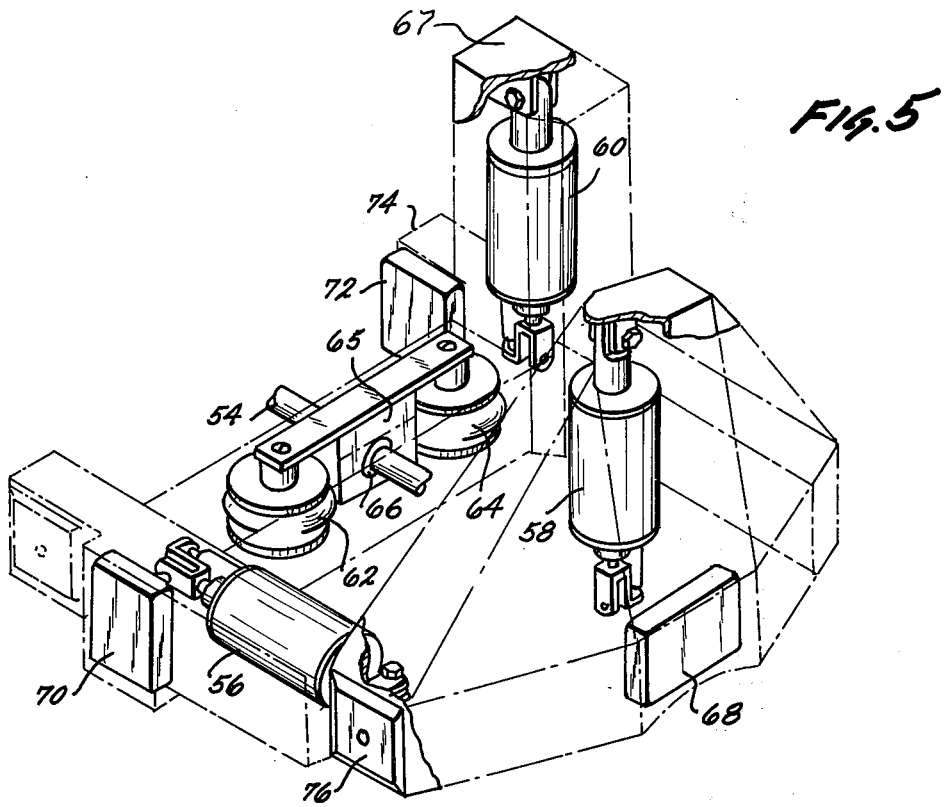
FIG. 5 is a perspective idealized view of a preferred embodiment of the present invention for stabilizing about three rotational axes.

FIG. 5 is a perspective mechanical view of a preferred embodiment of the present invention. In this embodiment the sensitive apparatus is to be stabilized in the three angular directions of yaw, pitch, and roll.

In FIG. 5, the apparatus itself is not shown, for clarity, although the points at which it is attached to the stabilizer are indicated. The weight of the apparatus to be stabilized rests on the attachment pin 54. The non-rotating parts 65 of the spherical bearing 66 is attached to the vehicle frame 67 through a pair of passive isolators 62 and 64.

Three linear actuators 56, 58, and 60 are connected to the frame structure 67 through pinned yokes shown at the ends of the actuators. The linear actuators 56, 58, 60 are positioned to enable them to apply torques about the appropriate axes.

Caging devices 68, 70, and 72 are provided to lock the sensitive apparatus in a fixed position when not in active use. It will be noted from FIG. 5 that the mechanical components of the system are held in their correct positions by a tubular box frame structure 74 which is strengthened at the points where it is attached to the vehicle 67, such as at vehicle interface pad 76.

For certain applications, a second preferred embodiment may have significant advantages. In that embodiment, the conventional spherical bearing of the above-described embodiment is replaced by a flexure pivot. Also, transfer functions in the accelerometer and rate gyro feedback loops are, in general, different; but otherwise the second preferred embodiment is identical to the above-described first preferred embodiment.

A flexure pivot is a commercially available component in which motion between a stationary part and a rotating part is enabled by flexure of an intermediate part. In contrast to the spherical bearing there is no static friction and, in addition, the flexure pivot exerts a torque opposing the angular displacement and proportional to it. These differences between the conventional bearing and the flexure pivot account for the different performance characteristics of the system in which they are employed.

From a practical standpoint, flexure pivots are available which are capable of supporting loads on the order of a thousand pounds, and which are no more elastic under applied forces than the structure on which they are mounted. Values expressly limited, the terms "bearing" and "bearing means" are used in this application shall include, but without limitation, both the conventional types of pivots, hinges and bearings, as well as the flexure pivots and bearings presently under discussion.

In contrast to the case of a conventional bearing, the equation of motion for sensitive apparatus isolated from an angularly vibrating vehicle by a flexure pivot is:

$$J \ddot{\theta}_L = K (\dot{\theta}_i - \dot{\theta}_L)$$

where J is the moment of inertia of the apparatus being stabilized, $\theta_i$ and $\theta_L$ are the angular positions of the vehicle and of the sensitive apparatus respectively, measured from a common steady-state origin, and K is the spring constant of the flexure pivot. The transfer function or transmissibility of the flexure pivot is the amplitude of the angular vibration of the apparatus to be stabilized divided by the amplitude of the angular vibration of the vehicle. The transmissibility can be found to be $$\frac{\theta_L(s)}{\theta_i(s)} = \frac{1}{s^2 \frac{J}{K} + 1}$$

It is immediately apparent that in contrast with the spherical bearing, the flexure pivot system is a second order system, having a resonant frequency of $$\frac{1}{2\pi}\sqrt{\frac{K}{J}}$$

and exhibiting a transmissibility that decreases at 12db per octave at frequencies above resonance. This is shown by Curve A of FIG. 6, wherein the angular transmissibility is the ordinate and the frequency of the vehicle angular vibration is the abscissa. Because the flexure pivot is relatively soft with respect to angular displacement, the resulting resonant frequency is rather low, typically on the order of 0.1 Hz. Because the 12db per octive rolloff begins at such a low frequency, the flexure pivot system exhibits a great performance advantage over more conventional systems.

Figure 6:
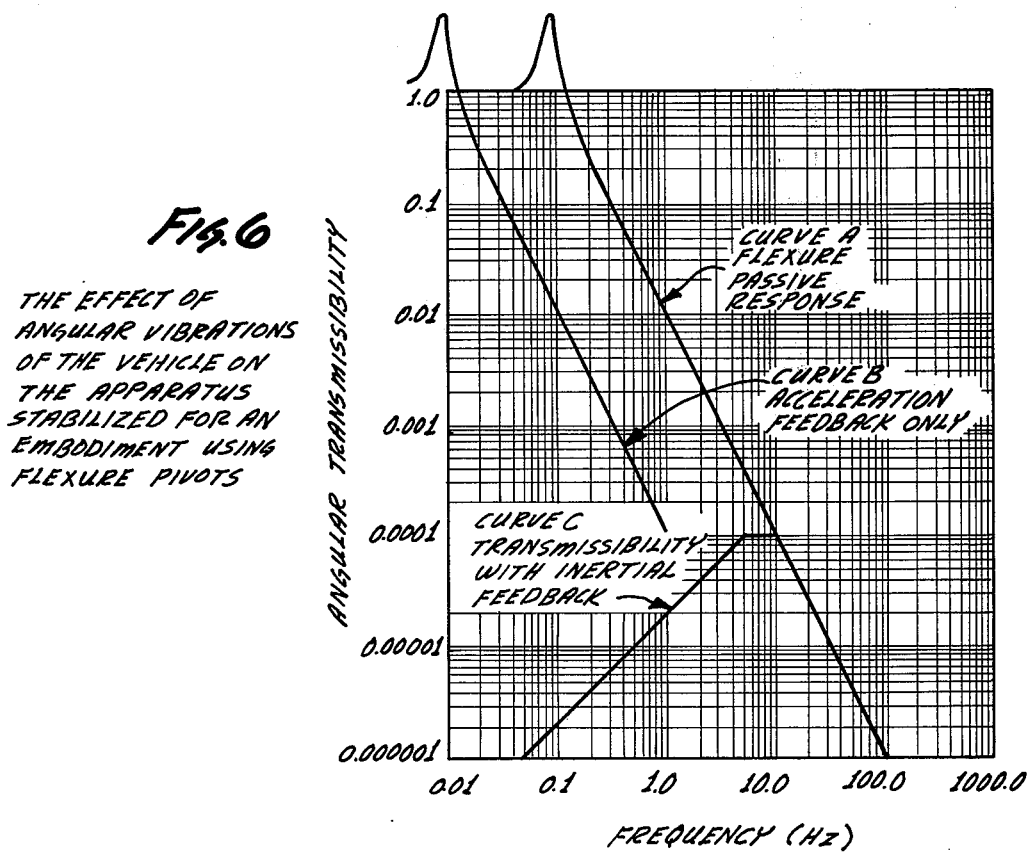
FIG. 6 is a graph showing the effect of vehicular angular vibrations on the apparatus stabilized for an embodiment using flexure pivots.

As in the case of the conventional bearing, the effect of a pure acceleration feedback term is to increase the effective moment of inertia of the apparatus to be stabilized. This in turn reduces the resonant frequency of the system, which then is inversely proportional to the square root of the effective moment of inertia of the apparatus. The entire Curve A of FIG. 6 is shifted to the left as shown by Curve B of FIG. 6, resulting in reduced transmissibility for any specific frequency about 1.4 times the new resonant frequency.

As in the case of the conventional bearing stabilizer, a rate gyro mounted on the apparatus to be stabilized is most useful for sensing low frequency angular velocities. Again, by judicious design, the rate gyro feedback loop transfer function can be implemented as a double integrator, thereby giving the transfer function of the rate gyro feedback loop a positive slope for the lower frequencies, which, when combined with the downward slope of the transfer function of the acceleration feedback loop, results in the overall transfer function shown as Curve C of FIG. 6.

Thus, there has been shown a system for stabilizing a sensitive apparatus from vibrations and shocks that are in a frequency range below that which can be easily attenuated by conventional passive spring isolators. The frequencies of interest here are within the range of the resonant frequencies of conventional passive isolators.

The system of the above-described embodiment of the present invention uses a linear actuator in parallel with the series combination of a passive isolator and a mounting at the center of gravity. The system combines the advantage of the favorable angular rejection obtainable from a center of gravity bearing mounting with the advantage of the isolation characteristics of a soft spring isolator. The result is exceptional rejection of angular motion and coupled torques. Furthermore, the use of an internal spherical bearing or flexure pivot within its design capabilities eliminates the need for large and heavy gimbals thereby resulting in low weight and volume. The resulting system has a very wide band frequency response for torque rejection and very low threshold friction. Further, in the event of a power failure the sensitive apparatus is still protected by the passive isolators and the center of gravity mounting.

The foregoing detailed description is illustrative of several embodiments of the invention and it is to be understood that additional embodiments thereof will be obvious to those skilled in the art. The embodiments described herein together with those additional embodiments are considered to be within the scope of the invention. For example, the bearings (either air or conventional) could be external to the payload and the system could be thought of as an external bearing or flexure soft mounted payload where the actuators apply correcting torques directly to the payload. The analytics for this technique fall under the analysis already presented.

Still further, linear inputs might be compensated for by using linear accelerometers as payload sensors, thereby actively reducing linear vibration over some frequency range.

By further example, active damping can be employed by sensing the relative velocity of the payload relative to the vehicle base and driving symmetrical vertical actuators to further dampen the vertical resonance of the suspension isolator.

What is claimed as new is:

1. In combination with apparatus to be stabilized against motion in a predetermined rotational direction and isolated from translational vibrations of its support, a stabilization system comprising in combination:
   a. bearing means having a fixed part and a rotatable part, said rotatable part being adapted to be attached to the apparatus to permit it to rotate in the predetermined rotational direction;
   b. isolation means connecting said fixed part of said bearing means to a supporting frame, said isolation means including a member relatively compliant in the direction of the translational vibrations of said support frame;
   c. dynamic correcting means including an actuator, connecting the apparatus with said supporting frame in parallel with the series combination of said bearing means and said isolation means, and disposed to apply torque to said apparatus in the predetermined direction in response to applied correcting signals;
   d. motion sensing means coupled to the apparatus for signaling rotation of the apparatus in the predetermined rotational direction; and
   e. feedback control means connected to said motion sensing means and said dynamic correcting means for generating correcting signals to drive said dynamic correcting means in accordance with a predetermined function of said motion sensing means signal,
   whereby said actuator applied restoring torques to the apparatus to oppose applied torques in the predetermined rotational direction.

2. The stabilization system of claim 1, wherein said motion sensing means include a rate gyro sensitive to motion of the apparatus in the predetermined rotational direction.

3. The stabilization systems of claim 1, wherein said motion sensing means include an angular accelerometer sensitive to acceleration of the apparatus in the predetermined rotational direction.

4. The stabilization systems of claim 3, wherein said motion sensing means further include a rate gyro sensitive to motion in the predetermined rotational direction.

5. The stabilization system of claim 1, wherein said isolation means compliant member is a spring member.

6. The stabilization system of claim 1 wherein said isolation means further include damping means.

7. The stabilization of claim 1 wherein said bearing means permits the apparatus to rotate in more than one rotational direction.

8. The stabilization system of claim 7, wherein said dynamic correcting means actuator is disposed to apply a torque in a predetermined direction.

9. The stabilization system of claim 8 wherein said motion sensing means includes a rate gyro sensitive to rotational motions of the apparatus having a motion component in said predetermined direction.

10. The stabilization system of claim 8, wherein said motion sensing means include an angular accelerometer sensitive to rotational accelerations of the apparatus having a component in said predetermined direction.

11. The stabilization system of claim 10 wherein said motion sensing means further include a rate gyro sensitive to rotational motions of the apparatus having a motion component in said predetermined direction.

12. The combination with apparatus to be stabilized against rotational movement about three mutually orthogonal axes and to be isolated from translational vibrations of its support, of a stabilizer system comprising, in combination:
   a. bearing means having a fixed part and a rotatable part, said rotatable part being attached to the apparatus to permit it to rotate in any direction;
   b. isolation means connecting said fixed part of said bearing means to a supporting frame, said isolation means including a member relatively compliant in response to translational vibrations of said support frame;
   c. dynamic correcting means including three actuators, each connecting the apparatus with said supporting frame and each disposed to apply torque to said apparatus about one of said predetermined three mutually orthogonal axes;
   d. rotational motion sensing means connected to the apparatus for generating signals corresponding to and representative of the rotational motion components of the apparatus about said three mutually orthogonal axes; and
   e. feedback control means connected to said motion sensing means and said dynamic correcting means, for generating output signals to drive said dynamic correcting means in accordance with a predetermined function of said rotational motion sensing means signals, whereby each actuator applies restoring torques to the apparatus about one of the three mutually orthogonal axes.

13. The stabilization system of claim 12 wherein said rotational motion sensing means include rate gyros sensitive to the rotational velocity components of the apparatus about said three mutually orthogonal axes.

14. The stabilization system of claim 12, wherein said rotational motion sensing means include angular accelerometers sensitive to the rotational acceleration component of the apparatus about said three mutually orthogonal axes.

15. The stabilization system of claim 14 wherein said rotational motion sensing means further include rate gyros sensitive to the rotational velocity components of the apparatus about said three mutually orthogonal axes.

16. The stabilization system of claim 12 wherein said isolation means further include active damping means.

* * * * *